Aug. 26, 1941.  A. E. ANDERSON  2,253,881
VALVE
Filed Aug. 21, 1939  3 Sheets-Sheet 1
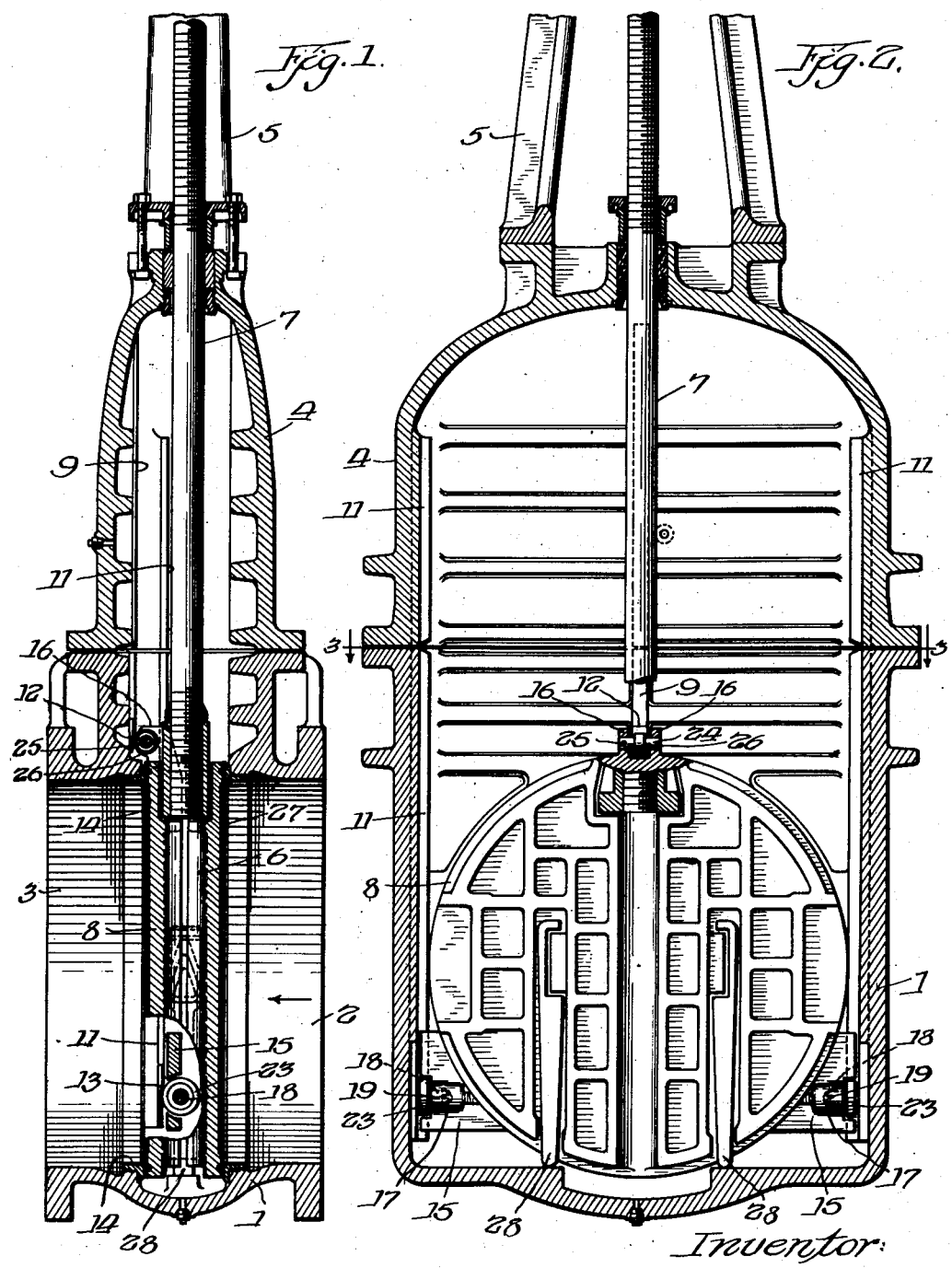
Inventor:
Andrew E. Anderson
By: Joseph O. Lange Atty.

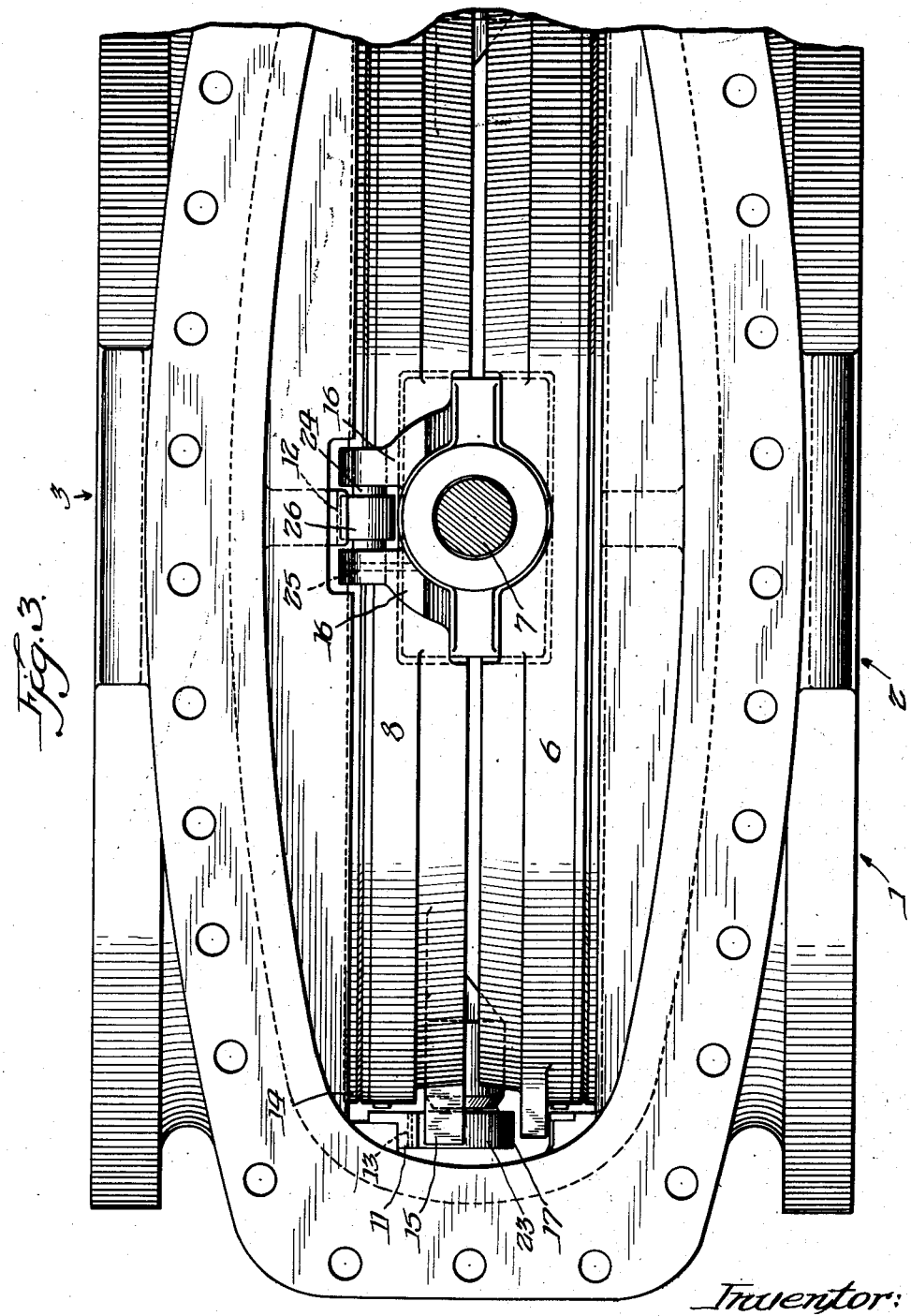

Aug. 26, 1941.  A. E. ANDERSON  2,253,881
VALVE
Filed Aug. 21, 1939  3 Sheets-Sheet 3
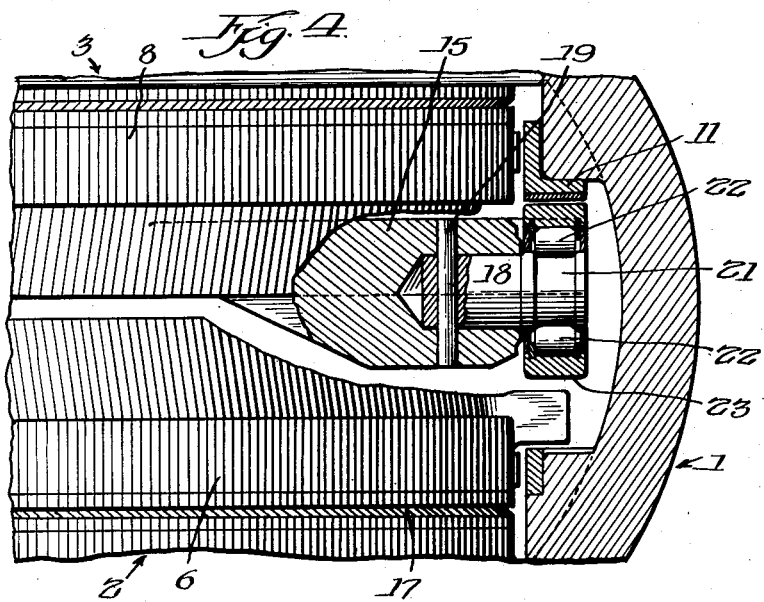
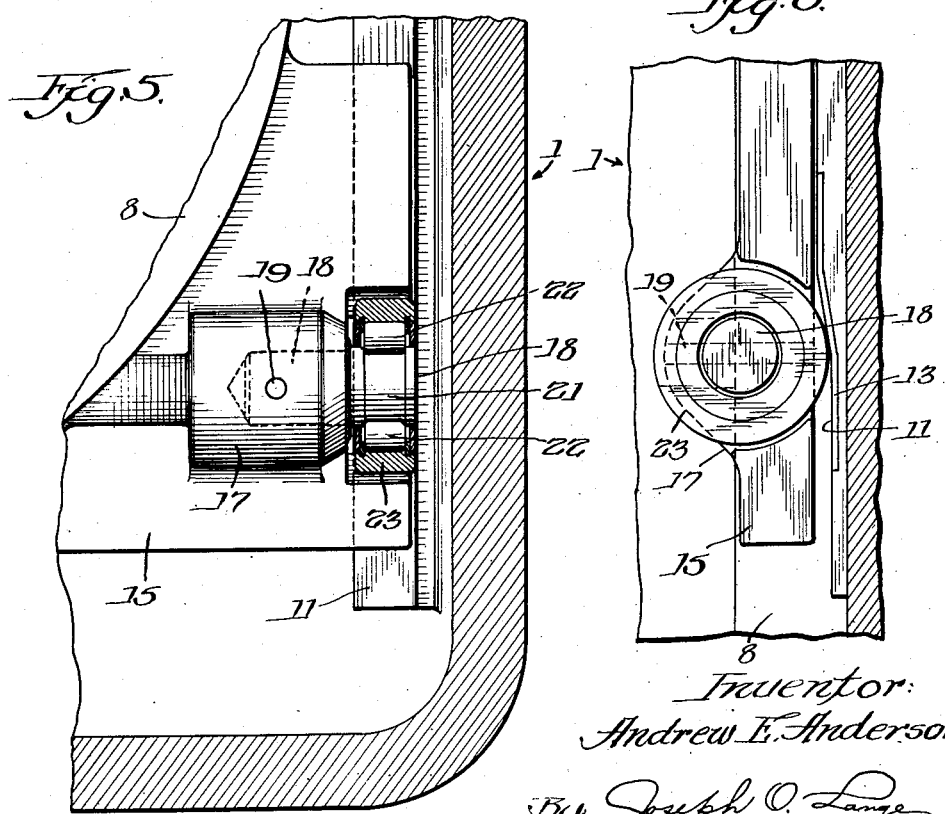
Inventor:
Andrew E. Anderson
By Joseph O. Lange
Atty.

Patented Aug. 26, 1941

2,253,881

UNITED STATES PATENT OFFICE 2,253,881

VALVE

Andrew E. Anderson, Berwyn, Ill., assignor to Crane Co., Chicago, Ill., a corporation of Illinois Application August 21, 1939, Serial No. 291,117

1 Claim. (Cl. 251—56)

This invention relates to valves and more particularly it relates to roller means for unseating the valve closure member and for sustaining the closure member out of contact with its seat in the body or casing for all positions of the closure member except in the fully closed position.

Certain service conditions such as, for example, on water works service wherein relatively large water pipelines require that control valves be placed in vertical sections of the pipe lines. Under such conditions, especially when the fluid flow is downwardly through the pipe and valve, a relatively heavy fluid pressure load is necessarily placed on the outlet side seating surface of the closure member when the valve is in the closed or partially closed position. When the valve is fully closed it is desirable to have the above mentioned load acting upon the closure member for the purpose of enhancing a close, fluid-tight contact between the seating surfaces. However, when the valve is partially or fully open it is then desirable to remove the load from the seating surfaces in order to avoid destructive abrasive or wearing action between the said surfaces during the moving of the closure member in the course of opening or closing the valve.

It is recognized that others have provided valves in which the closure members are moved away from the seats by shoes sliding along tracks within the bodies. However, valves provided with sliding shoes have been found generally unsatisfactory, inasmuch as the inclined portion of the track which serves to move the closure member laterally is subject to early destruction by reason of the excessive load frictionally placed upon it by the leading edge of the shoe. Thus frequent repairs which require shutting off the pipeline and dismantling of the valve are required.

Accordingly, it is an object of this invention to provide a valve in which rollers resting on guide tracks support the closure member apart from the outlet port seat at all positions of the closure member except in the fully closed position.

It is also an object of the invention to provide an easy operating valve in which the closure member has roller bearings cooperating with guide tracks to support the weight of the closure member and the load exerted by the fluid acting upon the closure member when the said closure member is not in alignment with the fluid passageway.

A still further object of the invention is to provide lateral supports for a valve closure member which are of simple, rugged and durable construction and which will have a positive action in supporting the said closure member.

Other objects and advantages will appear in the course of the following description of a preferred embodiment of the invention exemplified by the drawings in which—

Figure 1 is a vertical side sectional view of a double disc type gate valve embodying a preferred construction of the invention. The valve is shown in the closed position.

Figure 2 is a vertical end sectional view thereof looking toward the outlet end of the valve.

Figure 3 is a magnified view thereof taken on the line 3—3 of Figure 2.

Figure 4 is an enlarged fragmentary sectional view looking downwardly and showing in detail the construction of the roller and its attachment to the valve closure member.

Figure 5 is a fragmentary detail view of the roller looking toward the outlet end of the valve.

Figure 6 is an end view of the roller showing its position with respect to the guide track when the valve is in the closed position.

Like reference numerals refer to like parts throughout the various views of the drawings.

Referring generally to Figures 1, 2 and 3, the particular type of valve shown is a parallel seat double disc gate valve. This valve is shown for purposes of illustration only inasmuch as it is contemplated that the invention may readily be adapted for utilization in other types of valves. The valve comprises the usual body or casing, generally designated 1, having a passageway therethrough, one end of which is an inlet 2 and the other an outlet passage 3, a bonnet 4, a yoke 5, a closure member comprising a pair of discs 6 and 8, respectively, at the inlet and outlet, and an operating stem 7 the lower end of which is secured to the discs and the upper end of which is provided with any suitable or usual means (not shown) for reciprocating the stem and closure member. The ends of the casing 1 are suitably formed, as at 2, for convenient attachment of the valve to a pipeline and such attachment, for the proper operation of a valve embodying the present invention, should be such that the direction of fluid flow will be as indicated by the arrow within the inlet passage 2.

The invention provides for the attachment of rollers to the outlet side disc 8 for the purpose of rolling the closure member between the positions of "open" and "closed." In order to accomplish the above mentioned purpose, suitable guide tracks 9 and 11 are provided within the casing 1 and the bonnet 4 upon which the rollers may travel. Obviously, when the valve is in the closed position as shown, it is not desirable that the rollers sustain the load which is directed toward the outlet of the valve. Therefore, the inclined portions 12 and 13 are provided on the tracks 9 and 11 respectively, which permit lateral movement of the closure member toward or away from the outlet seat 14 (depending upon the direction of movement of the closure member) when the closure member is in substantial alignment with the passageway through the valve. As more clearly shown in Fig. 2, three rollers are preferably provided on the disc, however more or less rollers may be provided and if desired the spacing or arrangement of the rollers may be altered considerably.

The outlet disc 8 is provided with a pair of laterally extending projections 15 at the lower portion of the disc and with hub projections 16 adjacent the vertical diameter of the disc and at the top thereof. As more clearly shown in Figures 4, 5 and 6, each of the projections 15 is provided with a hub 17 for anchorage of the roller axle 18. Preferably, although not necessarily, one end of the axle 18 is screw threadedly attached to the hub 17 and secured against accidental removal by the pin 19. The other end of the axle provides a race 21 for a plurality of roller bearings 22 upon which the wheel 23 is mounted. Attention is directed to Figure 3 wherein it will be noted that the hub projections 16 at the upper central portion of the disc provide supports for both ends of the axle 24 which is secured against unintentional removal by the pin 25. The construction of the wheel 26 upon the axle 24 may, if desired, be similar to the wheel 23.

Referring to Figure 6, it will be noted that the wheel 23 is not in contact with the track. When the valve is in the closed position, it is preferable that all of the wheels 23 and 26 be slightly apart from the track for reasons previously explained, that is, to have no interference with normal seat thickness. During the initial opening movement of the valve, therefore, the disc will slide upon the seat 14 only until the wheels come in contact with their respective inclined portions of the tracks 9 and 11 whereupon the disc 8 will be forced laterally away from contact with the seat 14.

Also, during the final closing movement of the valve from the open position, the wheels will travel down the inclined portions and permit the disc to come in contact with the seat.

Inasmuch as the fluid pressure exerted against the inlet disc 6 tends to force this disc away from its seat 27 and toward the outlet disc 8 the provision of mounting rollers upon the disc 6 is not required. However, if desired, it may be advantageous in securing a fluid tight seating of the closure member to provide a wedging means between the discs such as the wedges 28 which cooperate with the casing when the valve is closed to spread the discs apart.

While the particular construction illustrated and described fully embodies the present invention, it is not desired to limit the invention thereto, inasmuch as various modifications and alterations may readily be made without departing from the spirit and scope of the invention as set forth in the appended claim.

I claim:

In a gate valve, a casing having an inlet and an outlet, a closure member therefor, an actuating stem connected to the said closure member, wedging means, bearing supports for the outlet portion of the said closure member, the said bearing supports comprising respective roller means positioned adjacent the stem connection between the said stem and closure member and also at each side adjacent the lowermost portion of the said closure member, tapered guide means for the said bearing supports within the said casing, the said guide means allowing for the outlet portion of the said closure member to move axially forward to contact with its seat when the said closure member is in substantial alignment with the casing outlet and to be withdrawn therefrom subsequent to movement of the said closure member in an opening direction.

ANDREW E. ANDERSON.